(12) United States Patent
Wieland

(10) Patent No.: US 8,819,299 B1
(45) Date of Patent: *Aug. 26, 2014

(54) METHOD FOR CREATION OF A DEVICE DRIVER FOR A PERIPHERAL DEVICE

(71) Applicant: Open Invention Network LLC, Durham, NC (US)

(72) Inventor: Martin Wieland, Munich (DE)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/044,016

(22) Filed: Oct. 2, 2013

Related U.S. Application Data

(63) Continuation of application No. 12/711,453, filed on Feb. 24, 2010, now Pat. No. 8,554,956.

(51) Int. Cl.
*G06F 3/00* (2006.01)

(52) U.S. Cl.
USPC ............................................. 710/8; 719/321

(58) Field of Classification Search
None
See application file for complete search history.

(56) References Cited

U.S. PATENT DOCUMENTS

| | | | |
|---|---|---|---|
| 5,339,432 A * | 8/1994 | Crick | 713/1 |
| 6,081,850 A * | 6/2000 | Garney | 710/15 |
| 6,263,387 B1 * | 7/2001 | Chrabaszcz | 710/302 |
| 2003/0070063 A1 * | 4/2003 | Boyle et al. | 713/2 |
| 2003/0088711 A1 * | 5/2003 | Tabares et al. | 709/321 |
| 2003/0132956 A1 * | 7/2003 | Duncan et al. | 345/735 |
| 2003/0225928 A1 * | 12/2003 | Paul | 709/321 |
| 2004/0230710 A1 * | 11/2004 | Goodman | 710/8 |
| 2005/0257226 A1 * | 11/2005 | Belvin et al. | 719/328 |

* cited by examiner

*Primary Examiner* — Elias Mamo
(74) *Attorney, Agent, or Firm* — Haynes and Boone, LLP

(57) ABSTRACT

A method and apparatus may be configured to create setup information, and perform the initialization and performance of an installation of a peripheral device of an electronic device. One example method may include storing a device identification (ID) of the peripheral device, extracting data and creating a data structure from existent setup information. The method may also include replacing a device ID in the data structure with the device ID of the peripheral device, and creating and storing a setup information file from content of the data structure. The method may also include creating and passing a request to at least one of a device driver of an interface of the peripheral device and a bus that initiates the installation of the peripheral device. The peripheral device may not be connected to the electronic device.

20 Claims, 3 Drawing Sheets

METHOD FOR CREATION OF A DEVICE DRIVER FOR A PERIPHERAL DEVICE

CROSS-REFERENCE TO RELATED APPLICATIONS

This application is a continuation of application Ser. No. 12/711,453, entitled "METHOD FOR CREATION OF A DEVICE DRIVER FOR A PERIPHERAL DEVICE", filed on Feb. 24, 2010, now issued U.S. Pat. No. 8,554,956, issued on Oct. 8, 2013, the entire contents of are hereby incorporated by reference.

TECHNICAL FIELD OF THE INVENTION

The present invention relates to a method for connecting an electronic device to a peripheral device generally and, more particularly, to a method for creation and setup of a device driver for peripheral devices that do not have a driver that matches the device identifier of the peripheral device.

BACKGROUND OF THE INVENTION

A hardware abstraction layer (HAL), in modern operating systems, is interposed between physical hardware and operating system (OS). The hardware abstraction layer (HAL) is an abstraction layer, implemented in software, between the physical hardware of a computer and the software that runs on that computer. Its function is to hide differences in hardware from most of the operating system kernel, so that most of the kernel-mode code does not need to be changed to run on systems with different hardware. On a electronic device such as a computer, HAL can basically be considered to be the driver for the motherboard and allows instructions from higher level computer languages to communicate with lower level components, such as directly with hardware.

Open source operating systems, and some other portable operating systems also have a HAL, even if it's not explicitly designated as such. Some operating systems, such as Linux, have the ability to insert one while running. Popular expansion buses which are used on more than one architecture are also abstracted, such as ISA, EISA, PCI, PCI-E allowing, from the OS manufacturers point of view, drivers to also be highly portable with a minimum of code modification.

As the HAL was introduced and is supplied by the manufacturer of the OS the OS, thus its manufacturer gains extensive control of the hardware. The OS is only capable to identify physical existent hardware by specific information held ready and passed by the hardware. A technique that allows to actively build all required information for a peripheral device before it is connected to the electronic device and even is able to morph the physical existent peripheral device into a device desired by the OS is not currently known in the art. However, such technique would offer significant advantages over the prior art.

A device driver, in electronic data processing, is a computer program that allows a higher-level computer program to interact with a hardware device. A device driver typically communicates with the device through the system bus or a communications subsystem to which the hardware is connected. When a calling program invokes a routine in the driver, the driver issues commands to the device. Once the device sends data back to the driver, the driver may invoke routines in the original calling program. Seen from the OS manufacturer's point of view, a device driver simplifies programming by acting as an abstraction layer between a hardware device and the application and OS that uses it. The higher-level application code can be written independently of whatever specific hardware device it will ultimately control, as it can interface with it in a standard way, regardless of the underlying hardware. Every version of a device requires its own hardware-specific specialized commands. In contrast, most applications utilize devices by means of simplified high-level device-generic commands. The device-driver accepts these commands and breaks them into a series of low-level device-specific commands as required by the device being driven. By design device drivers are hardware-dependent and operating-system-specific.

A virtual device driver as disclosed in U.S. Pat. No. 6,968,307 is a particular variant of device drivers. Instead of enabling the OS to dialog with physical existent hardware, a virtual device driver takes the opposite role and emulates a piece of hardware, so that the OS and its application programs have the illusion of accessing real hardware. Attempts by the OS or an application program to access the virtual hardware may also be routed to physical existent hardware.

U.S. Pat. No. 7,571,445 describes a system and method for dynamic device driver support in an open source operating system. This technique introduces a device driver for a computer system that includes an open source operating system, including an open source kernel. The device driver is constructed from an open source service layer and a set of precompiled driver modules that can be compiled against the kernel of the operating system. A service layer provides an interface between the kernel of the operating system and a set of applicable driver modules. Although this method allows the usage of one OS service layer for multiple hardware devices hardware specific device drivers for each peripheral device are still needed. A solution for physical existent devices that do not have a driver that matches the device identifier of the device is not included.

U.S. Pat. No. 6,754,725 discloses an USB peripheral that contains its own device driver. The invention concerns a peripheral device comprising a computer readable media and an interface circuit. The computer readable media may be configured to store instructions for operating the peripheral device. The interface circuit may be configured to communicate the instructions to an operating system of a computer in response to connection of the peripheral device to the computer. Although this invention eliminates the need to install a hardware specific device driver from separate media it requires a computer readable media in the device itself therefore making it impossible to use the invention on devices that do not provide such a capability. As the invention still requires a hardware-specific device driver it does not give an acceptable answer to the question how devices that have no such driver can communicate with the computer.

In U.S. Pat. No. 5,794,032 a system for the identification and configuration of computer hardware peripherals is shown that allows the automatic identification and configuration of a computer peripheral. The system uses an initialization program to send one or more query instructions to a peripheral device. In response to the query instructions, the peripheral drive replies with data that can be used to uniquely identify the model number or type of the device. The system then selects the appropriate software driver for the identified peripheral device and loads the selected driver. This approach also requires appropriate hardware specific drivers to be installed on the computer before the peripheral device is plugged in. As the HAL of modern operating systems permits direct hardware access this technique is only applicable for operating systems that do not have such intermediate layer.

U.S. Pat. No. 7,574,713 discloses methods, systems, and computer program products for instantiating a device driver for communication with a device by dynamically associating the device driver at run-time with a device-specific and/or service-specific software component. This may be done by instantiating a device driver for communication with a device by dynamically associating the device driver at run-time with a device-specific software component. The software component contains information that facilitates communication with devices of a specific type. In other embodiments, a device driver is instantiated by defining a plurality of device parameters and associating one or more of the plurality of device parameters with a service. The device parameters that are associated with the service are then dynamically communicated to the device driver at run-time. Thus, a generic device driver may be dynamically configured at run-time to communicate with devices of a particular device type and/or device parameters may be associated with a service and communicated to the device driver.

These device parameters that are associated with a particular service and then passed to the device driver may allow the device driver to collect data from a particular device that is relevant to a particular service offering. Although this invention allows ultraflexible access to and configuration of devices it requires the lower level components to be recognized and accessible by the HAL before the methods can come into operation.

U.S. Pat. No. 7,275,118 shows an input/output (I/O) device driver loading method for a data processing system that involves communication of a secondary I/O device driver to a data processing system using a primary I/O device driver. An initial (first) device identification information is passed from the peripheral device to the dataprocessing system. This first device identification information corresponds to a first I/O device driver in the data processing system. By utilizing the invention the device then transmits a second I/O device driver from the peripheral device to the data processing system using the first I/O device driver in the data processing system. A second device identification information is then passed from the peripheral device to the data processing system.

Although this method allows the use of simplified generic device class drivers to establish an initial communication with the data processing system to transmit additional device drivers and device identification information to the data processing system it requires the device to be plugged into the data processing system and a hardware specific device driver to be available for the peripheral device. Also this method does not give an acceptable answer to the question on how devices can be installed and used that do not have a hardware specific driver for any of the transmitted device identification information.

U.S. Pat. No. 6,345,319 discloses a setting method for installation of a plug and play device by utilizing the set-up file (INF) of a hardware driver. The method reads the device ID of a new device and copies the driver file of the new device to the corresponding directory. The device ID and all related device class of an already installed (original) device is deleted from the computer's registry. After a restart of the computer the OS displays that a new device is found and automatically establishes the relationship between the new device and the previously installed driver through the new device ID and class in order to let the new device be operated normally. Although the invention describes a method to make changes to an existing system configuration it requires an already installed compatible device and a hardware-specific device driver for the new device. In addition a restart of the computer is mandatory. The required deletion of existing registry entries most likely will be prohibited by the OS or my lead to serious corruption of the computers registry.

SUMMARY OF THE INVENTION

All operations required to create and operate a peripheral device of an electronic device can be performed without the need to plug in the peripheral device to the electronic device. Setup information for a peripheral device is extracted, modified and stored to fit to a physical existent peripheral device. The modified setup information is used to create a data structure that is passed to the peripheral bus driver. As the data structure contains a hot plug notification the reception causes the peripheral bus driver to initiate the setup process for the peripheral device. As the data structure is built from setup information that is available at the electronic device no additional user action is required. If used with a physical existent peripheral device that has multiple functional capabilities the present invention allows to transfer the features of other devices to this device.

Example embodiments of the present invention provide ways to perform all operations required to build setup information, install and initialize a peripheral device of an electronic device without the need to plug in the peripheral device to the electronic device. Setup information for a peripheral device is extracted, modified and stored to fit to a physical existent peripheral device. The modified setup information is used to create a data structure that is passed to the peripheral bus driver. As the data structure contains a hot plug notification the reception causes the peripheral bus driver to initiate the setup process for the peripheral device. As the data structure is built from setup information that is available at the electronic device no additional user action is required.

If used with a physical existent peripheral device that has multiple functional capabilities the example embodiments of the present invention permit the features of other devices to be transferred to this device.

Other example embodiments of the present invention may include devices that do not contain required electronic parts for successful initialization of a setup process may be installed. Compatible devices that do not have their own set of device drivers may use setup data from existent devices. Devices that are compatible but do not have signed drivers may be used in an environment that requires signed drivers. A device with multiple functional capabilities can lend device information from already installed devices. Non PnP devices can behave like PnP devices as the initial creation process does not require the hardware to be connected.

An example embodiment of the present invention may include a method for creation of setup information, and the initialization and performance of an installation of a peripheral device of an electronic device. The method may include storing a device identification (ID) of the peripheral device, extracting data and creating a data structure from existent setup information. The method may also include replacing a device ID in the data structure with the device ID of the peripheral device, and creating and storing a setup information file from content of the data structure. The method may also include creating and passing a request to at least one of a device driver of an interface of the peripheral device and a bus that initiates the installation of the peripheral device, wherein the peripheral device is not connected to the electronic device.

Another example embodiment of the present invention may include an apparatus configured to create setup information, and perform the initialization and performance of an installation of a peripheral device of the apparatus. The apparatus may include a memory configured to store a device identification (ID) of the peripheral device. The apparatus may also include a processor configured to perform various operations, such as, to extract data and create a data structure from existent setup information, replace a device ID in the data structure with the device ID of the peripheral device, create and store a setup information file from content of the data structure, and create and pass a request to at least one of a device driver of an interface of the peripheral device and a bus that initiates the installation of the peripheral device. The peripheral device may not be connected to the apparatus.

DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
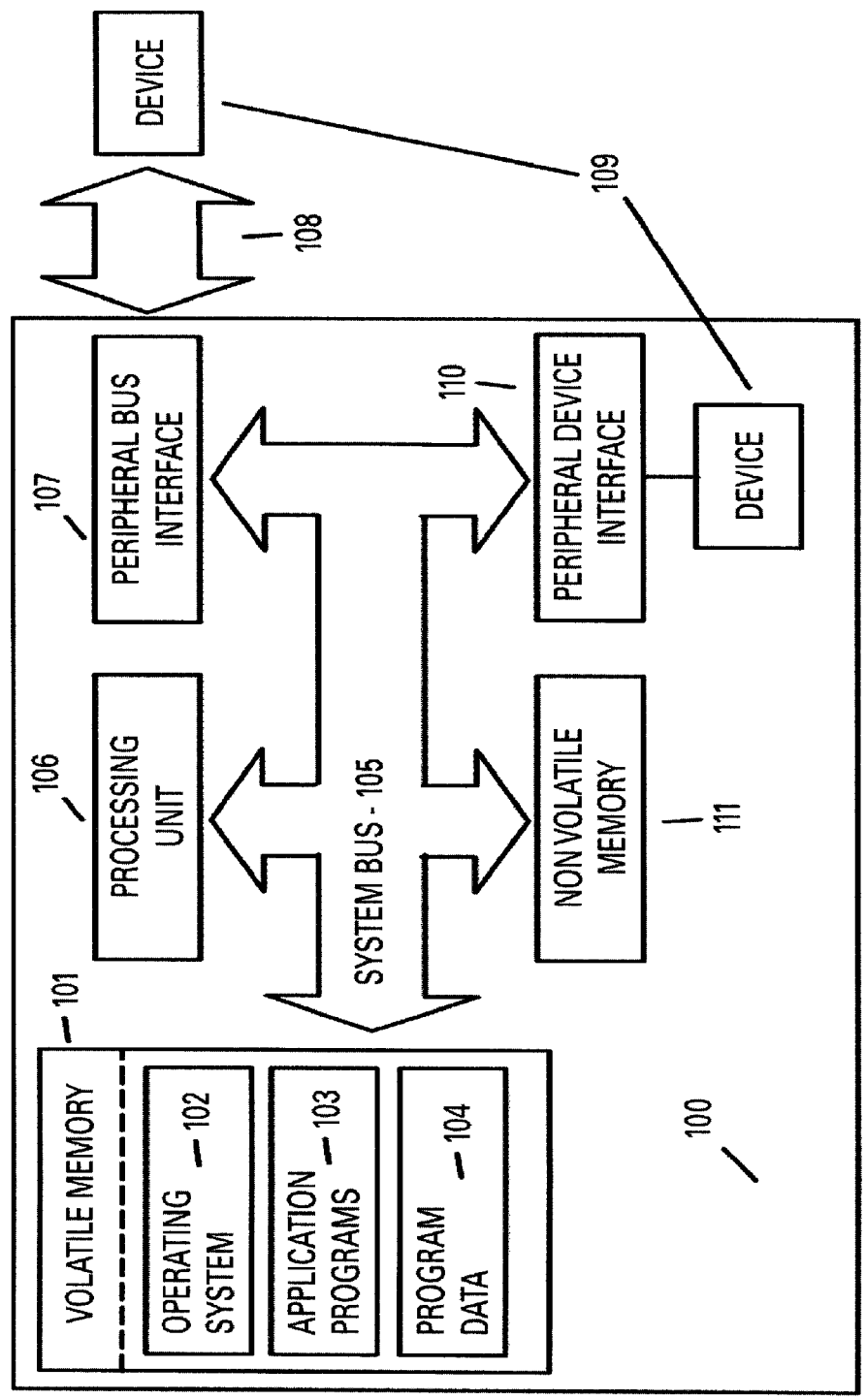
FIG. 1 is a block diagram of an exemplary operating environment.

Example embodiments of the present invention may be more described with reference to FIGS. 1-3. FIG. 1 is a schematic diagram of a conventional digital electronic device that can be used to implement various features, according to example embodiments of the present invention.

Referring to FIG. 1, a new peripheral device 109 is connected to a peripheral device interface 110 or a peripheral bus 108 that is connected to the system bus 105 by a peripheral bus interface 107, the electronic device 100 detects the presence of the connected peripheral device and a configuration process (e.g., enumeration) begins.

An enumeration process, according to example embodiments of the present invention assigns a unique address to the connected peripheral device, queries the connected peripheral device about requirements and capabilities, writes data about the connected peripheral device to the OS 102 of the electronic device and loads the appropriate software device driver from a non volatile memory into the OS.

The device driver is a program that allows the OS and application programs 103 to communicate correctly with the peripheral device. The device driver may also provide information to the electronic devices operating system about the peripheral device and allows transfer of program data 104 to the peripheral device.

Figure 3:
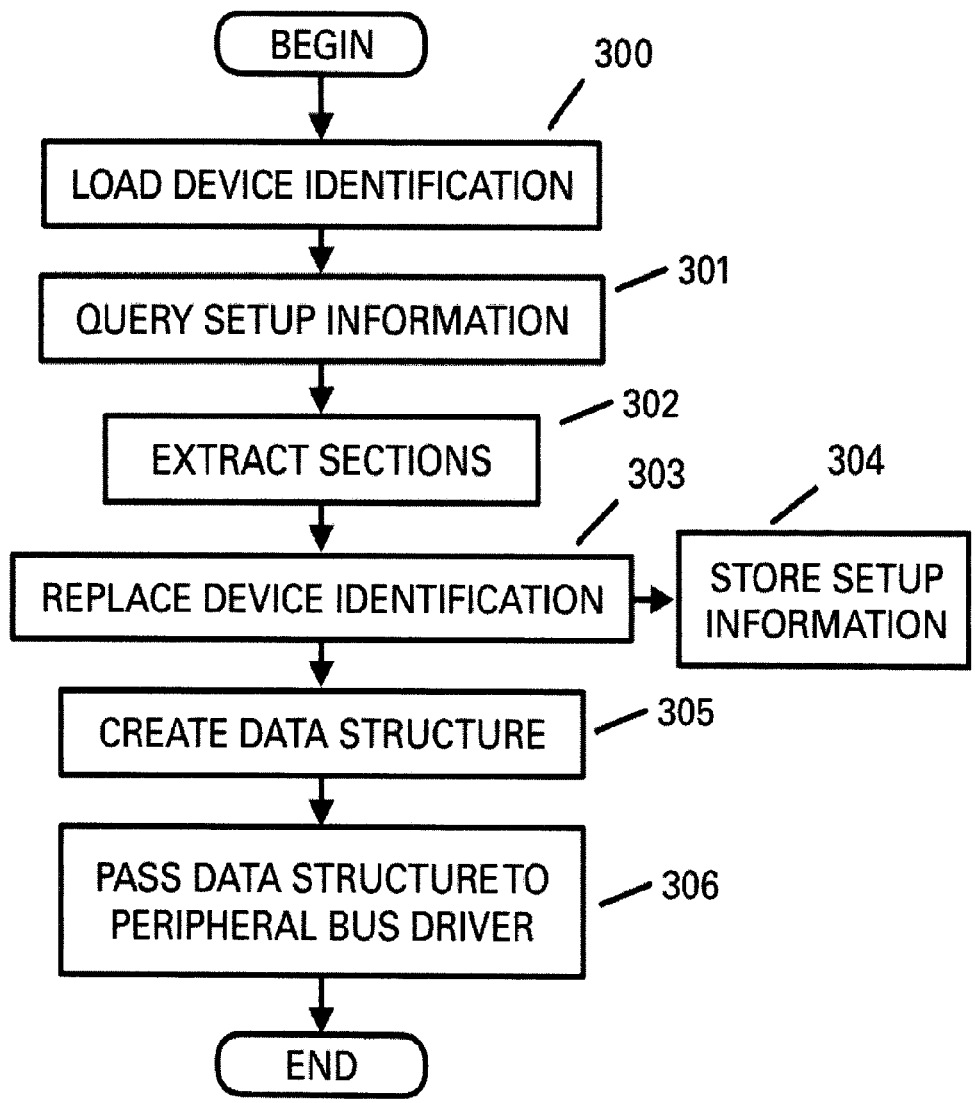
FIG. 3 is a flow chart illustrating a method of creating a device driver and initializing the setup process in accordance with the present invention.

FIG. 3 is a flow chart illustrating a method of creating a device driver and initializing the setup process in accordance with an example embodiment of the present invention. Initially, information 301 may be collected about a desired device and an appropriate setup information file 304 may be created for the device. Such a procedure may either be performed by extracting installation information from an existing device or by utilizing a prebuilt setup information file. Setup information is stored in a plain text file. The plain text file is divided into sections that contain information about the peripheral device's capabilities, dependencies and requirements.

During the setup process, the OS loads the setup information file into volatile memory, identifies the sections, reads the content of each section and writes entries to the registry configuration database of the electronic device. Instead of making changes to the configuration database of the electronic device, this method may be used to instead build a temporary data structure that is required to perform a set of operations. The temporary data structure may be held in volatile memory such as a random access memory (RAM), or be stored to non volatile memory such as a physical storage device.

As the OS searches and selects the appropriate setup information file for a peripheral device by comparing the class and the device id of the peripheral device with the class and the device id stored in the setup information file, certain changes may be necessary. For example, changes to the contents of the data structure are necessary to create a setup information file that accommodates the peripheral device.

The device id of the extracted or prebuilt setup information file stored in the temporary data structure is exchanged with the device id 300 of the physical peripheral device that would ultimately be plugged into the peripheral bus. This may either be accomplished by user input, or by reading a plain text file, which is supplied with the peripheral device and which contains the device id. The content of the modified data structure is used to build the setup information file 304 for the new device. This setup information file is stored to a location that the electronic device may be able to locate such information.

In the next operation, the temporary data structure is used to create a data structure 305 that is needed to initialize the setup process for the new device without the need for the physical device to be plugged into the peripheral bus or interface of the electronic device. As the bus driver of a peripheral bus is accessible and accepts configuration requests from either the peripheral bus or the system bus, the configuration request can thus be formed from the content of the temporary data structure. The request can be built and sent by either an application upon user request or a generic multi purpose device driver or service that automatically starts when the creation of the temporary data structure is finished.

The data structure sent to the bus driver contains at least the request to add a new device, and the class and the device id, which are both taken from the temporary data structure. The class and the device id allow the proper selection of the setup information file built in the prior operation. Reception of this data structure at the peripheral bus driver causes the function driver for the bus device to determine that a new device is on its bus.

Figure 2:
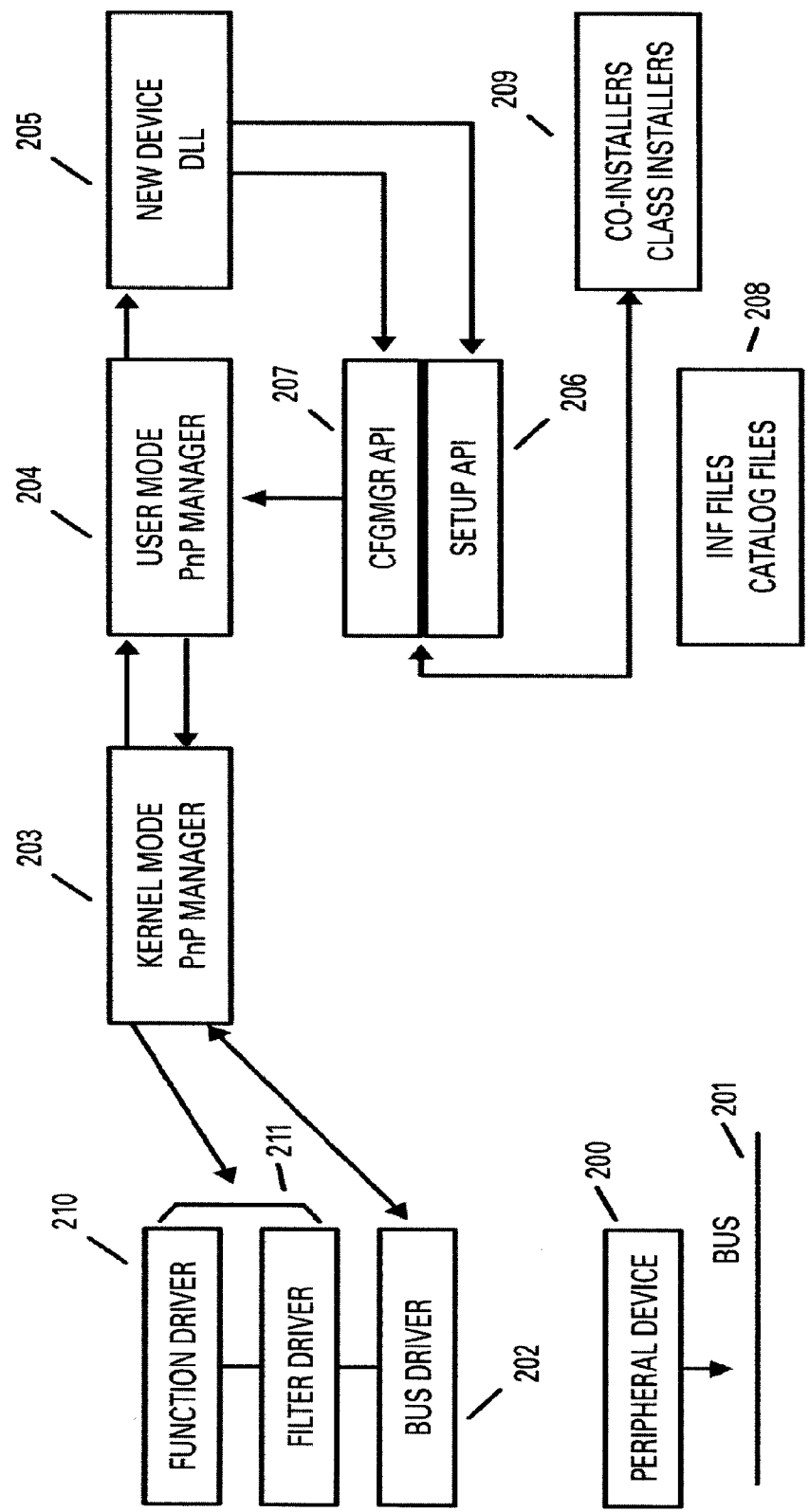
FIG. 2 is a block diagram showing involved components when using the invention with Microsoft Windows Operating Systems

FIG. 2 is a block diagram showing involved components when using the above-noted application program operations of the example embodiments with Microsoft Windows® Operating Systems. Passing the data structure to the peripheral bus driver 202 causes actions that are similar to plugging a peripheral device 200 into the peripheral bus 201. If the data structure passed to the peripheral bus driver contains a notification flag and the bus supports hot-plug notification, the application program of the present invention may be applied while the system is running. Now the peripheral device is enumerated.

The bus driver 202, targeted by the data structure, receives the hot-plug notification flag of the new device. The bus driver notifies the kernel-mode PnP manager 203 that the list of devices on the bus has changed. In this case, the change is a new device on the bus. The kernel-mode PnP manager queries the bus driver for a list of devices present on the bus by sending a query for BusRelations. The bus driver responds to the query with a current list of devices on the bus. The kernel-mode PnP manager compares the new list against the previous list and, in this case, determines that there is one new device on the bus.

The kernel-mode PnP manager sends queries to the bus driver to gather information about the new device, such as the device's hardware IDs, compatible IDs, and device capabilities. The kernel-mode PnP manager notifies the user-mode PnP manager 204 that there is a device to be installed. The user-mode PnP manager tries to perform a trusted installation. Since the data structure, that is passed to the peripheral bus driver, was generated from the setup information file and the setup information file is stored at a location where the electronic device expects the information, a server side installation can be performed. The user-mode PnP manager creates a new process using rundll132.exe and launches newdev.dll 205 to install the device.

The new device DLL calls setup API 206 device installation functions and CfgMgr API 207 PnP configuration manager functions to carry out its installation tasks. The new device DLL queries the system to build a list of possible drivers for the device. As the setup information file stored in the previous operations is available on the system and matches the new device, the returned driver list contains the required driver.

Setup uses the class and classGUID entries in the device's INF version section to determine the device setup class. The setup class determines the class installer and the class co-installers for the device, if any. Device-specific co-installers are listed in the appropriate INF section. Setup then transfers control to kernel mode to load drivers and start the device.

Once Setup has selected the driver for the device, copied the appropriate driver files, registered any device-specific co-installers, and registered any device interfaces, it transfers control to kernel mode to load the drivers and try to start the device. The appropriate CfgMgr function sends a request to the user-mode PnP manager, which passes it to the kernel-mode PnP manager. The PnP manager loads the appropriate function driver 210 and any optional filter driver 211 for the device.

The PnP manager calls the DriverEntry routine for any required driver that is not yet loaded. The PnP manager then calls the AddDevice routine for each driver, starting with lower filter drivers, then the function driver, and, lastly, any upper filter drivers. The PnP manager assigns resources to the device, if required, and sends a start request to the device's drivers.

After finishing these operations, the physical existent peripheral device may be plugged into the peripheral bus. As the peripheral device sends a hot-plug notification, and its device class and device id match with the driver installed by the data structure, the electronic device assumes that the peripheral device is plugged in and starts it.

Although the invention has been described in relation to preferred embodiments, many variations, equivalents, modifications and other uses will become apparent to those skilled in the art. It is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
   creating a data structure;
   replacing a device identification (ID) in the data structure with a device ID of a peripheral device;
   creating a setup information file from content of the data structure;
   sending the data structure to a bus driver, the data structure including a request to add a new peripheral device, a class of the peripheral device and the device ID of the peripheral device; and
   transmitting a request to a device driver of an interface of the peripheral device and a bus that initiates the installation of the peripheral device, wherein the peripheral device is not connected to the electronic device, and wherein the transmitting of the data structure causes a function driver for the bus to determine that a new device is on the bus.

2. The method of claim 1, wherein a previously existent setup information is stored in a file.

3. The method of claim 1, wherein the data structure is created from existent setup information wherein the existent setup information is stored in a configuration memory of the electronic device.

4. The method of claim 1, further comprising adding entries to provide Plug and Play functionality to the data structure generated from an existent setup information file that does not provide such functionality.

5. The method of claim 1, further comprising passing an instance ID to the driver of the peripheral interface or bus to identify an instance of the peripheral device.

6. The method according to claim 1, wherein the bus is an expansion bus.

7. The method according to claim 1, wherein the bus is a peripheral bus.

8. The method of claim 1, wherein the peripheral device supports the functionality of multiple devices and the operations of creation of setup information, initialization and performance of an installation are performed for each supported functionality of the multiple devices.

9. The method of claim 1 comprising storing the device ID of the peripheral device.

10. An apparatus, comprising:
    a memory; and
    a processor communicably coupled to the memory, the processor configured to:
    create a data structure,
    replace a device identification (ID) in the data structure with a device ID of a peripheral device;
    create a setup information file from content of the data structure,
    send the data structure to a bus driver, the data structure including a request to add a new peripheral device, a class of the peripheral device and the device ID of the peripheral device, and
    transmit a request to a device driver of an interface of the peripheral device and a bus that initiates the installation of the peripheral device, wherein the peripheral device is not connected to the apparatus, and wherein the transmitting of the data structure causes a function driver for the bus to determine that a new device is on the bus.

11. The apparatus of claim 10, wherein a previously existent setup information is stored in a file.

12. The apparatus of claim 10, wherein the existent setup information is stored in a configuration memory of the apparatus.

13. The apparatus of claim 10, wherein the processor is further configured to add entries to provide Plug and Play functionality to the data structure generated from an existent setup information file that does not provide such functionality.

14. The apparatus of claim 10, wherein the processor is further configured to pass an instance ID to the driver of the peripheral interface or bus to identify an instance of the peripheral device.

15. The apparatus of claim 10, wherein the bus is an expansion bus.

16. The apparatus of claim 10, wherein the bus is a peripheral bus.

17. The apparatus of claim 10, wherein the peripheral device supports the functionality of multiple devices and the operations of creation of setup information, initialization and performance of an installation are performed for each supported functionality of the multiple devices.

18. A non-transitory computer readable medium comprising a computer program that when executed causes a processor to perform:

creating a data structure;

replacing a device identification (ID) in the data structure with a device ID of a peripheral device;

creating a setup information file from content of the data structure;

sending the data structure to a bus driver, the data structure including a request to add a new peripheral device, a class of the peripheral device and the device ID of the peripheral device; and transmitting a request to a device driver of an interface of the peripheral device and a bus that initiates the installation of the peripheral device, wherein the peripheral device is not connected to the electronic device, and wherein the transmitting of the data structure causes a function driver for the bus to determine that a new device is on the bus.

19. The non-transitory computer readable medium of claim 18, wherein the processor is further configured to perform:

adding entries to provide Plug and Play functionality to the data structure generated from an existent setup information file that does not provide such functionality.

20. The non-transitory computer readable medium of claim 18, wherein the processor is further configured to perform:

passing an instance ID to the driver of the peripheral interface or bus to identify an instance of the peripheral device.

* * * * *